US010351147B2

(12) United States Patent
Salter et al.

(10) Patent No.: US 10,351,147 B2
(45) Date of Patent: Jul. 16, 2019

(54) AUTONOMOUS SENSING VEHICLE PEDALS

(71) Applicant: Ford Global Technologies, LLC, Dearborn, MI (US)

(72) Inventors: Stuart C. Salter, White Lake, MI (US); Pietro Buttolo, Dearborn Heights, MI (US); James J. Surman, Clinton Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 67 days.

(21) Appl. No.: 15/270,226

(22) Filed: Sep. 20, 2016

(65) Prior Publication Data

US 2018/0079426 A1 Mar. 22, 2018

(51) Int. Cl.

| | |
|---|---|
| ***B60W 50/10*** | (2012.01) |
| ***B60W 50/08*** | (2012.01) |
| ***G05D 1/00*** | (2006.01) |

(52) U.S. Cl.

CPC .......... *B60W 50/082* (2013.01); *B60W 50/10* (2013.01); *G05D 1/0061* (2013.01); *G05D 1/0088* (2013.01); *B60W 2540/10* (2013.01); *G05D 2201/0213* (2013.01)

(58) Field of Classification Search

CPC ............... B60W 50/082; B60W 50/10; B60W 2540/10; G05D 1/0061; G05D 1/0088

USPC ........................................................ 701/49

See application file for complete search history.

(56) References Cited

U.S. PATENT DOCUMENTS

| | | | | |
|---|---|---|---|---|
| 6,474,753 | B1 | 11/2002 | Rieth et al. | |
| 6,833,791 | B2 | 12/2004 | Bullinger et al. | |
| 8,718,861 | B1 * | 5/2014 | Montemerlo ......... | B60W 30/00 701/26 |
| 2001/0033226 | A1 * | 10/2001 | Levy ........................ | B60Q 1/44 340/479 |
| 2014/0148988 | A1 * | 5/2014 | Lathrop ................ | B60W 50/10 701/23 |
| 2016/0027337 | A1 * | 1/2016 | Murphy ................ | B60W 50/14 340/457 |
| 2016/0082976 | A1 * | 3/2016 | Sugioka ........... | B60W 50/0098 701/23 |
| 2016/0207536 | A1 * | 7/2016 | Yamaoka ........... | B60W 30/182 |
| 2017/0174163 | A1 * | 6/2017 | Korthauer ........... | B60R 21/0134 |

FOREIGN PATENT DOCUMENTS

| | | | |
|---|---|---|---|
| FR | 2833227 | B1 | 12/2001 |
| FR | 2835221 | B1 | 1/2002 |
| FR | 2879527 | B1 | 12/2004 |
| JP | 2000136873 | A | 5/2000 |
| WO | WO 9908913 | | 2/1999 |

* cited by examiner

*Primary Examiner* — Nadeem Odeh

(74) *Attorney, Agent, or Firm* — Frank A. MacKenzie; Bejin Bieneman PLC

(57) ABSTRACT

A system includes a controller in a vehicle in communication with sensors supported on pedals of the vehicle. The controller includes instructions for determining a user intention based on a detected movement of a foot of the user. Upon determination that the user intention is to take over control the vehicle, the controller sets a control mode of the vehicle to a manual control mode.

18 Claims, 7 Drawing Sheets

100
START
110 Determine If Feet Proximate Pedals?
NO
120 Determine If Pedals Are Extended?
NO
YES
125 Retract Pedals
YES
RESTLESS MOVEMENT
130 Determine Intention Of Foot Movement?
155 Send Notification
AMBIGUOUS MOVEMENT
PRIORITY TAKEOVER
NORMAL TAKEOVER
135 User Control Request Recieved?
NO
YES
140 Extend Pedals
150 Set To User Control Mode
END

AUTONOMOUS SENSING VEHICLE PEDALS

BACKGROUND

Known vehicles have various levels of automation. The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle tasks. At level 1 ("driver assistance"), the vehicle sometimes assists with steering, acceleration, or braking, but the driver is still responsible for the vast majority of the vehicle tasks. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention. The host vehicle may operate in one or more of the levels of autonomous vehicle operation.

Various devices and methods are also known to transition control of the driving tasks from the vehicle, i.e. automated control, to the driver, i.e. manual control, and vice versa. Improvements to the devices and methods are desired.

DETAILED DESCRIPTION

Figure 1:
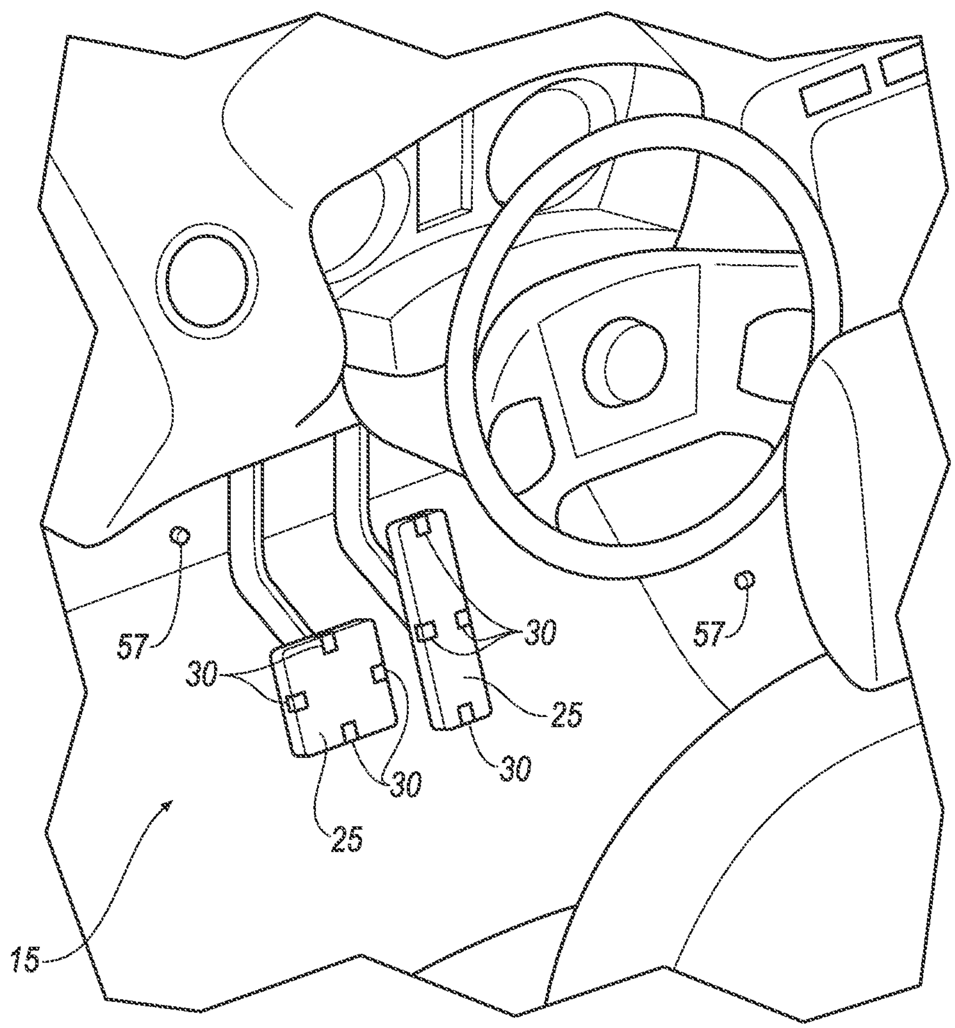
FIG. 1 illustrates a perspective view of an interior of a vehicle having an example pedal sensor system.

An example pedal sensor system 15 for a vehicle (not numbered) includes a pedal positioning device 20 with a pedal 25 supporting one or more proximity sensors 30. The pedal 25 is moveable between an extended and a retracted position. A controller 40 is programmed to determine a user intention based on information received from the proximity sensor(s) 30. The controller 40 is further programmed to, upon determination that the user intends to take over control of the vehicle, set a control mode of the vehicle to a manual control mode. In manual control mode a user of the vehicle controls a driving task such as accelerating, braking, steering, etc.

In the following description, relative orientations and directions (by way of example, top, bottom, forward, rearward, front, rear, back, outboard, inboard, inward, outward, lateral, left, right) are from the perspective of an occupant seated in a driver seat, facing a dashboard.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIGS. 1-4, pedal sensor system 15 includes the pedal positioning device 20 that includes one or more pedals 25. The pedals 25 are disposed in a passenger compartment of a vehicle, accessible to a user of the vehicle. For example, the pedals 25 may be located in a foot well of the vehicle, enabling the user to operate the pedals with a foot of the user.

Figure 2:
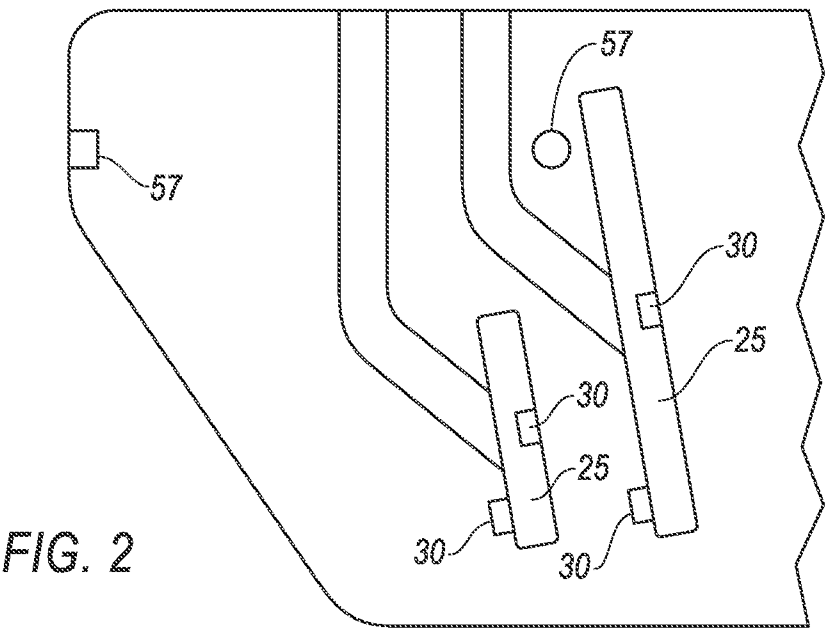
FIG. 2 illustrates a side view of pedals of the pedal sensor system of FIG. 1 in an extended position.
Figure 3:
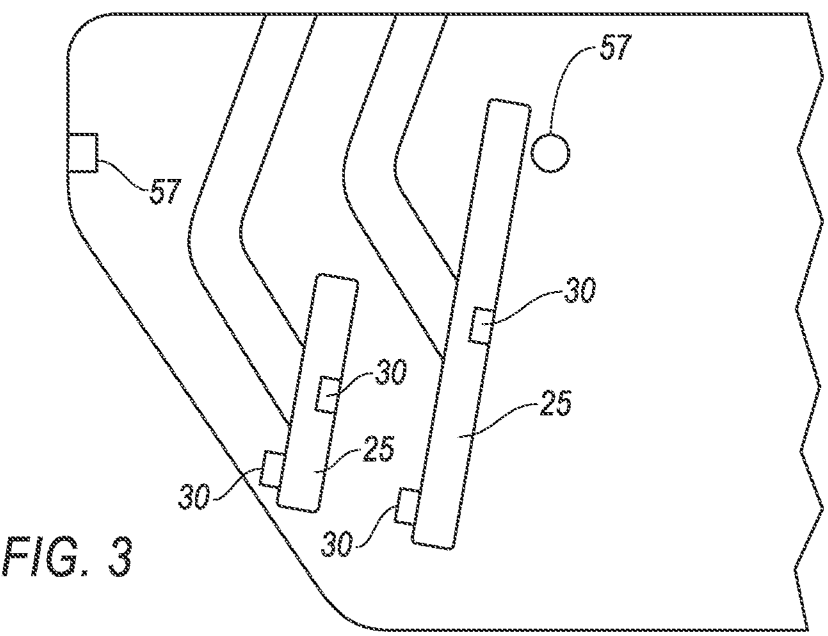
FIG. 3 illustrates a side view of the pedals of FIG. 2 in a retracted position.
Figure 4:
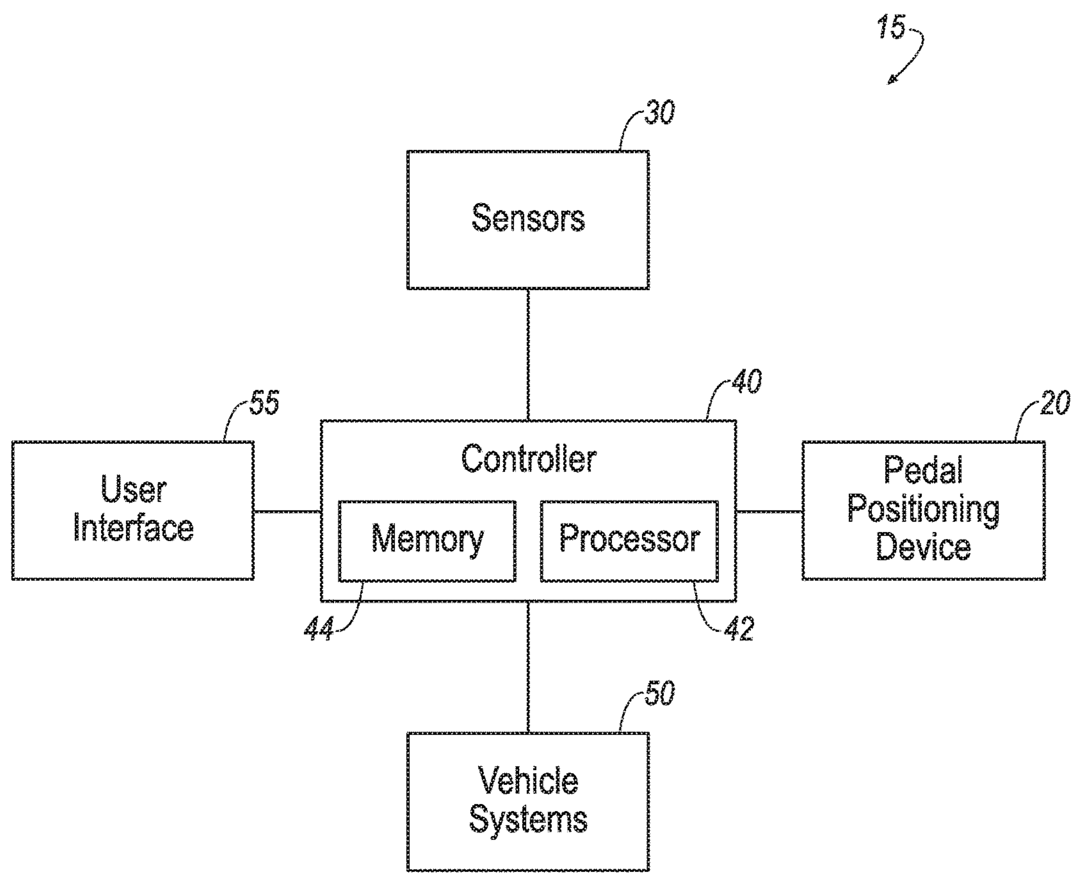
FIG. 4 illustrates a block diagram of components of the pedal sensor system of FIG. 1.

The pedal positioning device 20 is operable to move the pedals 25 between an extended position, as shown in FIG. 2, and a retracted position, as shown in FIG. 3. For example, the pedal position device 20 may retract the pedals 25 in a vehicle forward direction and/or downwardly away from the feet of the user in the retracted position. As another example, the pedal position device 20 may retract the pedals 25 to be flush with a bulkhead, dash, and/or floor of the vehicle in the retracted position, the pedal positioning device 20 may include known structures and may perform known techniques to move the pedals 25 between the extended and retracted positions.

One or more sensors 30 detect the location and movement of the foot of the user relative to the pedals 25. Exemplary sensors 30 include proximity sensors, such as capacitive or photoelectric sensors, digital cameras, infrared cameras, LiDAR, etc. The sensors 30 may be supported on various locations of the pedals 25. These locations include sensors 30 proximate opposing right and left edges, opposing top and bottom edges, and on a back surface of the pedal 25.

The sensors 30 are in communication with a controller 40. The controller 40 is a computing device that includes a processor 42 and memory 44.

The processor 42 is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor 42 can receive data from sensors 30 and memory 44. The processor 32 may be programmed to process the sensor data. Processing the data may include processing the data stream captured by the sensors 30 to determine the intention of the user of the vehicle based on that user's detected foot movement, and to switch between autonomous and manual vehicle modes based on the determined intention. As described below, the processor 42 instructs vehicle components to actuate in accordance with the sensor data. The processor 32 may be incorporated into a controller, e.g., an autonomous mode controller.

The memory 44 is implemented via circuits, chips or other electronic components and can include one or more of read only memory (ROM), random access memory (RAM), flash memory, electrically programmable memory (EPROM), electrically programmable and erasable memory (EE- PROM), embedded MultiMediaCard (eMMC), a hard drive, or any volatile or non-volatile media etc. The memory 44 of the controller 40 may include memory for storing instructions executable by the processor 42 as well as for electronically storing data and/or databases. The memory of the vehicle controller further generally stores remote data received via various communications mechanisms; e.g., the vehicle controller is generally configured for communications on a controller area network (CAN) bus or the like, and/or for using other wired or wireless protocols, e.g., Bluetooth, etc. The vehicle controller may also have a connection to an onboard diagnostics connector (OBD-II). Via a vehicle network using Ethernet, Wi-Fi®, the CAN bus, Local Interconnect Network (LIN), and/or other wired or wireless mechanisms, the vehicle controller may transmit messages to various devices in the vehicle and/or receive messages from the various devices, e.g., controllers, actuators, sensors, etc., discussed herein.

The controller 40 is in communication with various other known vehicle systems 50, such a powertrain system, a steering system, a braking system, a geolocation system, a navigation system, etc. The controller 40 is programed to autonomously control these vehicle systems using known algorithms by outputting signals to control units associated with these systems.

The controller 40 is also in communication with a user interface device 55. The user interface 55 presents information to and receives information from an occupant of the vehicle. Exemplary outputs of the user interface include analog and digital gages and dials, indicator lights 57 of various color, brightness, and shape, tactile feedback devices that provide vibration to a surface the user contacts, such as the steering wheel, etc. As shown, lights 57 may be disposed in the foot well of the vehicle. The user interface may be located, e.g., on an instrument panel in a passenger cabin of the vehicle, or wherever may be readily seen by the occupant. The user interface may include dials, digital readouts, screens, speakers, and so on for providing information to the occupant, e.g., human-machine interface (HMI) elements and graphical user interface (GUI) elements such as are known. The user interface may include buttons, knobs, GUIs, keypads, microphone, and so on for receiving information from the occupant. In some possible approaches, the user interface device may include a touch-sensitive display screen.

The controller 40 is in communication with the pedal positioning device 20. The controller 40 programmed to instruct the pedal positioning device 20 to move the pedals 25 between the extended and retracted position, based in part on information received form the sensors 30.

The controller 40 is further programed to transition the vehicle between levels of autonomous control, transferring control of driving tasks between the user in a manual control mode and the controller 40 in autonomous control mode. The transition is based in part on information received from the sensors 30.

Figure 5:
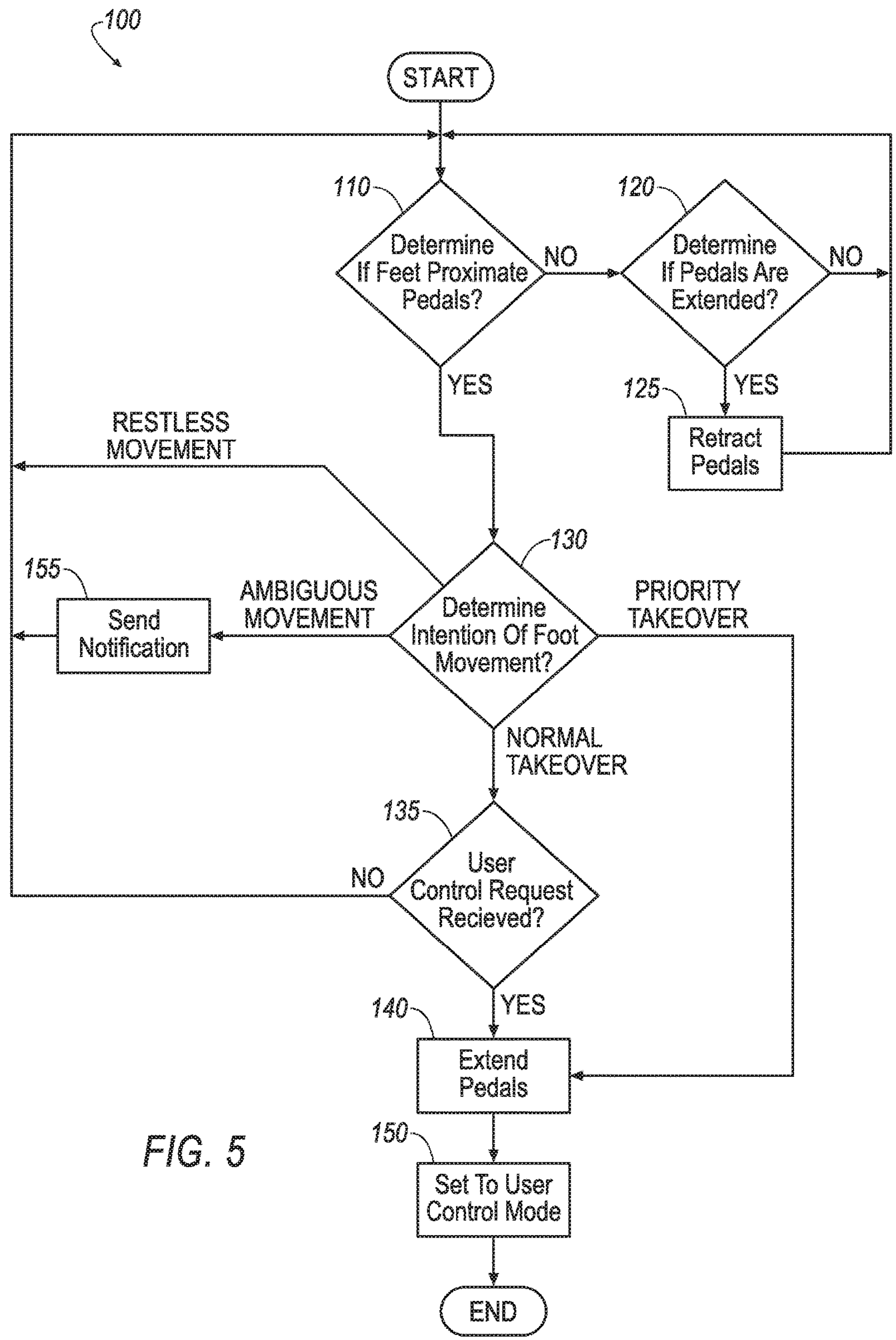
FIG. 5 illustrates a flow chart of a process for controlling the vehicle of FIG. 1

FIG. 5 is a flowchart of an example process 100 that may be implemented by one or more components of the system 15 of FIGS. 1-4.

The process 100 is initiated by the controller 40 when the vehicle is placed in an autonomous mode, thereby having the controller 40 assume one or more driving task from control of the user. Exemplary driving tasks include control of steering, acceleration, and braking. The controller 40 identifies when the vehicle is placed in autonomous mode by receiving an instruction or self-determination. For example, the user or a separate computer may communicate with the controller 40 to provide such instruction through the user interface or other electronic communication channels, such as Wi-Fi and cellular connections. In further example, the controller 40 may monitor various inputs to determine when to place the vehicle in autonomous mode, such as placing the vehicle in autonomous mode in response to the vehicle entering an expressway, as identified using known geolocation and navigation systems in communication the controller 40.

Starting at a block 110, the controller 40 determines when the user's foot is proximate the pedals 25. The determination may include a determination that the user's foot is in the area behind the pedals based on data received from the sensor 30 supported on the back of the pedal 25. The determination is made by the controller 40 based on information received from the sensors 30, for example if a proximity sensor 30 outputs a value above a predetermined threshold.

When the controller 40 determines that the user's foot is not proximate the pedals 25, i.e., is not within a threshold distance as measured by the sensors 30, a block 120 is executed. At the block 120, the controller 40 determines if the pedals are in an extended position. For example, the controller 40 communicates with the pedal positioning device 20 to request pedal position information, such information indicating the state of the pedals 25. The pedal position information is the sent from the pedal positioning device 20 and received by the controller 40. The controller 40 moves to block 125 when the controller 40 determines that the pedals 25 are extended. Else, the controller 40 returns to the block 110 to continue the process 100 in a closed loop manner until the process 100 ends.

At the block 125, the controller 40 causes the pedals 25 to move to the retracted position. For example, the controller 40 sends an instruction to the pedal positioning device 20 to actuate and move the pedals 25 from the extended position to the retracted position. After the controller 40 causes the pedals 25 to retract, the controller 40 returns to the block 110 to continue the process 100 in a closed loop manner until the process 100 ends.

When the controller 40 determines that the user's foot is proximate the pedals 25, a block 130 is executed. At the block 130 the controller 40 determines whether the user intends to take over control of one or more driving functions based on the foot movement detected by the sensors 30. For example, as set forth further below, the controller 40 may determine that the foot movement is indicative of a priority takeover, a normal takeover, or is restless foot movement. In a further example, the movement may be considered by the controller 40 to be ambiguous movement. Additionally, and/or alternatively, when the controller 40 determines that the user's foot is proximate the pedals 25, such as when the controller 40 determines that user's foot is behind the pedal 25, the controller 40 may refrain from moving to the block 125, thereby inhibiting retraction of the pedals 25.

With reference to FIGS. 6 through 10, exemplary signal value data received by the controller 40 from the sensors 30 over a period of time is illustrated. The higher the signal data value, the closer the user's foot is to the sensor 30 associated with signal. FIGS. 6 through 10 shows two signals, one represented by a solid line and the other represented by a dashed line. Each signal is associated with its own sensor 30. It is understood that multiple sensors 30 may be combined to generate a single signal.

Figure 6:
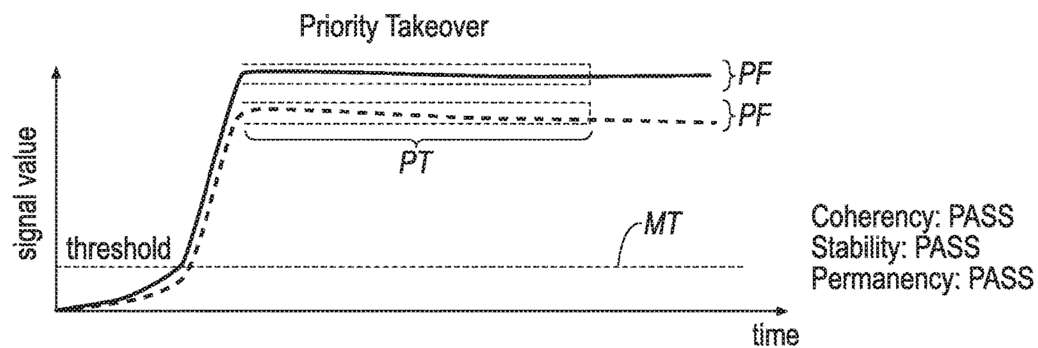
FIG. 6 is an illustration of pedal sensor signal values over time indicative of a priority takeover.

With reference to FIG. 6, as can be seen in the illustration, the signal values rise and fall at substantially the same time, indicating a coherency to the signals. The signal values rise above a predetermined minimum threshold MT for a predetermined period of time PT, indicating a permanency to the signals. The signal values also stay within a predetermined range of fluctuation PF for the predetermined period of time PT after rising, indicating a stability to the signals. Based on the receipt of signals that are coherent, stable and permanent, the controller 40 determines that the user intends to take over manual control of at least one driving task from autonomous control of the vehicle.

Figure 7:
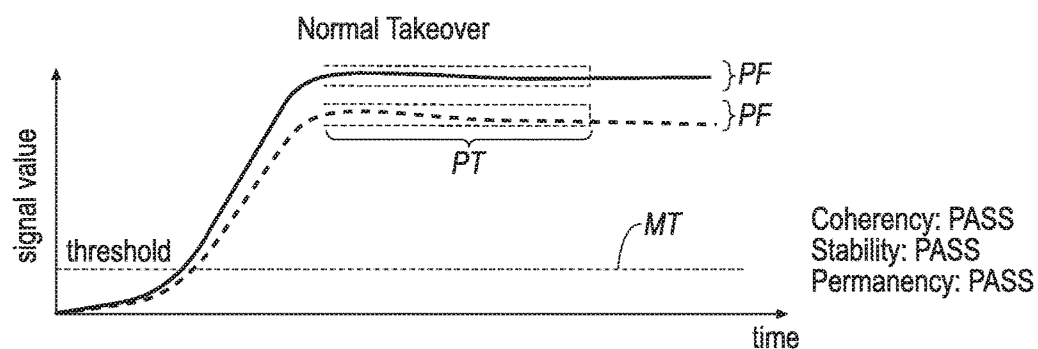
FIG. 7 is an illustration of pedal sensor signal values over time indicative of a normal takeover.

When determining that the user intends to take over manual control, the controller 40 also determines if the takeover is a normal takeover or a priority takeover. For example, when the rate of increase in signal strength is above a predetermined threshold amount, the controller 40 determines that the takeover is the priority takeover. When the rate of increase in signal value is below the predetermined threshold amount, the controller 40 determines that the takeover is the normal takeover. This is illustrated in FIGS. 6 and 7 where the slope of the signal as it increases is greater in FIG. 6 than in FIG. 7. The increased slope is caused by faster movement of the user's foot, as expected in an priority situation.

In response to the controller 40 determining that the normal takeover is intended by the user, the controller 40 moves to a block 135. At the block 135 the controller 40 determines whether a user manual control request has been received by the controller 40. The user manual controller request may be received by the controller 40 based on an input from the user, or the user manual controller request may be generated and received by the controller 40 internally. For example, the controller 40 may instruct the user interface 55 to query the user regarding the intention to take over manual control, such as with a visual message or audible broadcast, to which the user may provide an affirmative response via interaction with the user interface 55, thereby triggering the user interface to send the user control request to the controller 40. In another example, the controller 40 may inform the user, via the user interface 55, that within a predetermined amount of time manual control will be initiated unless the user affirmatively opts out, such as through a related input to the user interface 55, which generates an opt out instruction to send to the controller 40. When the opt out instruction is not received by the controller 40 within the predetermined amount of time, the controller 40 may generate and receive the user manual control request.

Once the controller 40 determines that the user manual control request has been received, the controller moves to a block 140. At the block 140 the controller 40 causes the pedals 25 to be moved to the extended position. For example, the controller 40 sends an instruction to the pedal positioning device 20 to extend the pedals 25.

Additionally, after the controller 40 determines that the user manual control request has been received, the controller 40 moves to a block 150. At the block 150 the controller 40 switches at least one driving task from autonomous mode control to manual mode control. Once block 150 has been executed the process ends.

Continuing the description of the block 135, when the controller does not receive the user manual control request within a predetermined amount of the time, the controller 40 returns to the block 110 to continue the process 100 in a looped manner.

Continuing the description of the block 130, in response to the controller 40 determining that the priority takeover is intended by the user, the controller moves to the block 140 and the block 150 directly, extending the pedals and switching at least one driving task from autonomous mode to manual mode, as discussed above, without executing the block 135. Once block 150 has been executed the process ends.

Again continuing the description of the block 130, the controller 40 may determine movement of the user's foot to be restless movement.

Figure 8:
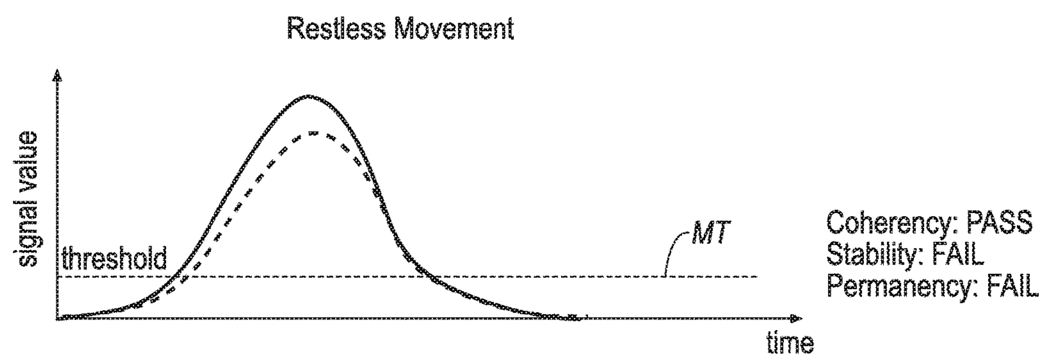
FIG. 8 is an illustration of pedal sensor signal values over time indicative of restless movement.

For example, restless movement may include the user's foot approaching and then retreating from the pedals 25. Such movement produces the signals illustrated in FIG. 8. The signal values rise and fall together, indicating coherent signals, however they do not remain above the predetermined threshold MT for the predetermined period of time PT. Accordingly, the signals in FIG. 8 are not stable or permanent.

Figure 9:
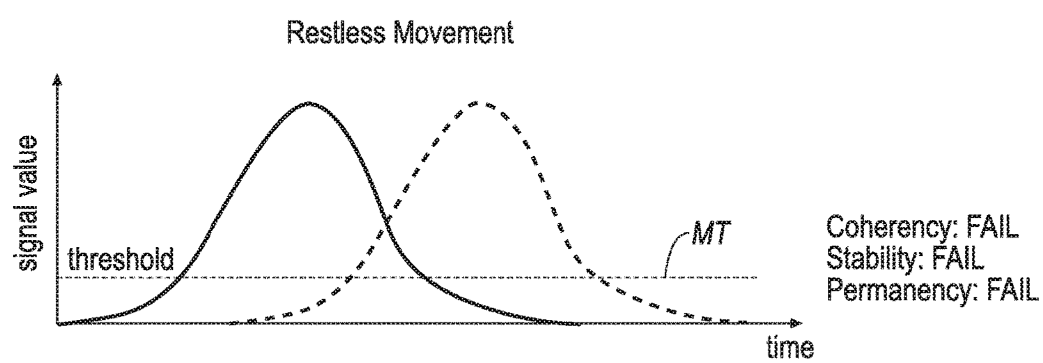
FIG. 9 is an illustration of other pedal sensor signal values over time indicative of restless movement.
Figure 10:
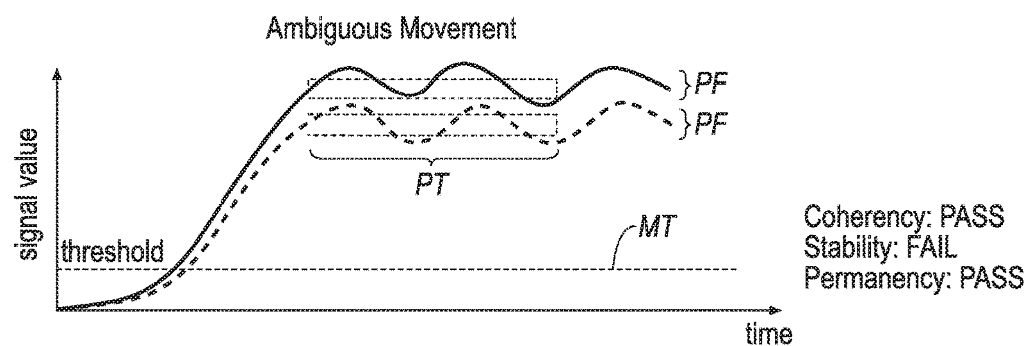
FIG. 10 is an illustration of pedal sensor signal values over time indicative of ambiguous movement.

In another example, restless movement may include the user's foot passing over the pedal from right to left or top to bottom. Such movement produces the signals illustrated in FIG. 9. The signal values in FIG. 9 do not raise and fall together, nor do they remain above the predetermined threshold MT for the predetermined period of time PT. The signals in FIG. 9 are not coherent, stable or permanent.

In response to the controller 40 determining that the movement of the user's foot is restless movement, the controller 40 returns to the block 110 to continue the process 100 in a closed loop manner until the process 100 ends.

Again continuing the description of the block 130, the controller 40 may determine movement of the user's foot to be ambiguous movement based on receipt of signals that are coherent and permanent, but not stable. For example, ambiguous movement may include the user's foot approaching the pedals 25 and hovering without making contact. Such movement produces the signals illustrated in FIG. 10. The signal values in FIG. 10 rise and fall together, indicating a coherency to the signals. The signals stay above the predetermined threshold MT for the predetermined amount of time PT, indicating a permanency to the signals. However, fluctuation of the signal values above the predetermined range of fluctuation PF, indicating that the signals are not stable. In response to the controller 40 determining that the movement of the user's foot is ambiguous movement, the controller moves to a block 155.

At the block 155 the controller 40 sends a notification directed to the user associated with the ambiguous movement determination. For example, the controller 40 may instruct the user interface to display a visual message or broadcast an audible message that the user's foot is encroaching the pedals 25. Alternatively, and/or additionally, the controller may cause the light 57 located in the foot well to be illuminated. After the controller executes the block 155, the controller 40 returns to the block 110 to continue the process 100 in a closed loop manner until the process 100 ends.

A pedal sensor system has been disclosed. The pedal sensor system detects a user's foot movement, and switches between autonomous control and manual control of a driving task depending on a determined user intention based on the detected foot movement.

With regard to the references to computers in the present description, computing devices such as those discussed herein generally each include instructions executable by one or more computing devices such as those identified above, and for carrying out blocks or steps of processes described above. For example, process blocks discussed above are embodied as computer executable instructions.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A controller in a vehicle, the controller comprising a processor and a memory storing instructions executable by the processor to:

determine a user intention based on a comparison of a slope of a signal value indicating a detected movement of a foot of a user approaching a pedal with a predetermined threshold slope; and upon determination that the user intention is to take over control of the vehicle, set the vehicle to a manual control mode;

wherein the determination that the user intention is to take over control of the vehicle is made in response to the controller receiving a plurality of signals from a plurality of sensors, the plurality of signals having signal values that rise and fall at substantially the same time, rise above a predetermined minimum threshold for a predetermined period of time, and stay within a predetermined range of fluctuation for the predetermined period of time after rising.

2. The controller of claim 1, wherein the memory stores instructions executable by the processor to:

upon determination that the user intention is to take over control of the vehicle, move a pedal of the vehicle to an extended position.

3. The controller of claim 1, wherein the memory stores instructions executable by the processor to:

determine that the user intention is to take over control of the vehicle as a normal takeover; and upon determination that the user intends the normal takeover, receive a manual control request before setting the vehicle to the manual control mode.

4. The controller of claim 3, wherein the memory stores instructions executable by the processor to determine that the user intends the normal takeover based on identifying the slope of the signal value is below the predetermined threshold slope.

5. The controller of claim 3, wherein the manual control request is generated in response to the user interacting with a user input device in communication with the controller.

6. The controller of claim 3, wherein the manual control request is generated by the controller when an opt out instruction is not received by the controller.

7. The controller of claim 3, wherein the memory stores instructions executable by the processor to determine that the user intends a priority takeover based on identifying the slope of the signal value is above the predetermined threshold slope.

8. The controller of claim 1, wherein the memory stores instructions executable by the processor to:

determine whether the signal value is above a predetermined threshold before determining the user intention; and upon determining that the signal value is not above the predetermined threshold, retract the pedal to a retracted position.

9. The controller of claim 1, wherein the memory stores instructions executable by the processor to:

determine when the foot of the user is behind the pedal; and upon determining that the foot is behind the pedal, inhibit retracting the pedal to a retracted position.

10. The controller of claim 1, wherein the memory stores instructions executable by the processor to:

determine that the user intention is to take over control of the vehicle as a priority takeover; and upon determination that the user intends the priority takeover, set the vehicle to the manual control mode without waiting to receive a manual control request.

11. The controller of claim 1, wherein the memory stores instructions executable by the processor to:

determine that the signal value fluctuates outside the predetermined range of fluctuation; and upon determination that the signal value fluctuates outside the predetermined range of fluctuation, actuate a light disposed in a foot well of the vehicle.

12. A system for a vehicle comprising:

a pedal positioning device including a pedal supporting a proximity sensor, the pedal moveable between an extended and a retracted position; and a controller programmed to determine a user intention based on a comparison of a slope of a signal value received from the proximity sensor with a predetermined threshold slope and to determine whether the signal value fluctuates outside of a predetermined range of fluctuation having an upper limit and a lower limit; and wherein the controller is programmed to, upon determination that the user intention is to take over control of the vehicle, set a control mode of the vehicle to a manual control mode; and wherein the controller is programmed to, upon determination the signal value fluctuates outside of the predetermined range of fluctuation, actuate a user interface device.

13. The system of claim 12, further comprising a plurality of sensors supported on the pedal.

14. The system of claim 13, wherein one of the plurality of sensors is located at a left side of the pedal, and one of the plurality of sensors is located at a right side of the pedal.

15. The system of claim 13, wherein one of the plurality of sensors is located at a top of the pedal, and one of the plurality of sensors is located at a bottom of the pedal.

16. The system of claim 13, wherein one of the plurality of sensors is located on a back surface of the pedal.

17. A method of controlling a vehicle comprising:

detecting movement of a foot of a user of the vehicle approaching a pedal;

determining a user intention based on a comparison of a slope of a signal value indicating the detected movement of the foot of the user with a predetermined threshold slope and based on a comparison of the signal value with a predetermined minimum threshold value and based on whether the signal value fluctuates outside of a predetermined range of fluctuation having an upper limit and a lower limit; and setting, upon determination that the user intention is to take over control of the vehicle, a control mode of the vehicle to a manual control mode.

18. The method of claim 17, further comprising:

moving, upon determination that the user intention is to take over control of the vehicle, the pedal to an extended position.

* * * * *